US009858162B2

United States Patent
Anderson et al.

(10) Patent No.: US 9,858,162 B2
(45) Date of Patent: Jan. 2, 2018

(54) CREATION OF A PROVISIONING ENVIRONMENT BASED ON PROBABILITY OF EVENTS

(71) Applicant: International Business Machines Corporation, Armonk, NY (US)

(72) Inventors: Eric M. Anderson, Friendswood, TX (US); Christopher J. Dawson, Arlington, VA (US); Robert A. Davis, Atlanta, GA (US); Patti Foley, Alvarado, TX (US)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 14/921,145

(22) Filed: Oct. 23, 2015

(65) Prior Publication Data

US 2017/0116091 A1    Apr. 27, 2017

(51) Int. Cl.
*G06F 11/00* (2006.01)
*G06F 11/20* (2006.01)
*H04L 12/24* (2006.01)

(52) U.S. Cl.
CPC ........ *G06F 11/203* (2013.01); *G06F 11/2033* (2013.01); *H04L 41/0806* (2013.01); *G06F 2201/805* (2013.01)

(58) Field of Classification Search
CPC .............. G06F 11/203; G06F 11/2023; G06F 11/2033; G06F 11/2097
See application file for complete search history.

(56) References Cited

U.S. PATENT DOCUMENTS

| 5,504,861 | A  | * | 4/1996 | Crockett ............. G06F 11/1435 714/13 |
| 9,606,878 | B2 | * | 3/2017 | Cao ..................... G06F 11/2023 |
| 2005/0066221 | A1 | * | 3/2005 | Benhamou ................ H04L 1/22 714/5.1 |
| 2006/0136490 | A1 |   | 6/2006 | Aggarwal |
| 2009/0169020 | A1 | * | 7/2009 | Sakthikumar ........... G06F 21/57 380/278 |

(Continued)

OTHER PUBLICATIONS

Gopisetty, S., Butler, E., Jaquet, S., Korupolu, M., Nayak, T.K., Routray, T., Seaman, M., Singh, A., Tan, C.H., Uttamchandani, S., Verma, A., Automated Planners for Storage Provisioning and Disaster Recovery, IBM J. Res. & Dev., Jul./Sep. 2008, pp. 353-365, vol. 52, No. 4/5.

(Continued)

*Primary Examiner* — Philip Guyton
(74) *Attorney, Agent, or Firm* — George R. McGuire; Bond Schoeneck & King, PLLC; John Pivnichny

(57) ABSTRACT

A method for dynamically assembling a mobile application includes the steps of: (i) receiving a first probability of a potential failure occurring within a first computing environment; (ii) comparing the first probability to a first threshold; (iii) automatically provisioning a first portion of a second computing environment in response to the first probability exceeding the first threshold; (iv) receiving a second probability of the potential failure occurring within the first computing environment; (v) comparing the second probability to a second threshold; and (vi) automatically provisioning a second portion of the second computing environment in response to the second probability exceeding the second threshold.

19 Claims, 2 Drawing Sheets

(56) References Cited

U.S. PATENT DOCUMENTS

| | | |
|---|---|---|
| 2011/0214009 A1 | 9/2011 | Aggarwal |
| 2013/0111260 A1 | 5/2013 | Reddy |
| 2014/0189441 A1* | 7/2014 | Ishida ................. G06F 11/3006 714/47.3 |
| 2014/0379833 A1* | 12/2014 | Nunami .............. H04L 67/1097 709/212 |
| 2015/0227426 A1* | 8/2015 | Andrade Costa ... G06F 11/1415 714/47.3 |

OTHER PUBLICATIONS

Dash, P., Yalamanchili, C., Jagtap, A., Gajbhiye, S., Limaye, P., Using I/O Shipping to Maximize Availability, Optimize Error Handling and Detach Policies, and Maintain High Availability and Disaster Recovery Readiness, ip.com, Jul. 3, 2013.

IBM, Method and System for Obtaining IT Configuration Information for Automated and Proactive Inventory Analysis in a Disaster Recovery Environment, ip.com, Aug. 31, 2009.

* cited by examiner

CREATION OF A PROVISIONING ENVIRONMENT BASED ON PROBABILITY OF EVENTS

BACKGROUND

The present invention is directed to methods and systems for automatically creating a provisioning environment based on the probability of an event necessitating disaster recovery from the provisioned environment.

Disaster preparedness and recovery are a necessary aspect of any mission critical software, hardware, or information technology product or service in order to ensure continuity of service in the event of a catastrophic event. The costs associated with downtime during an event can be significant. Accordingly, it is necessary to have duplication of data and data processing systems, such as a disaster recovery environment, to rely on when the primary data or systems are damaged, destroyed, or otherwise non-functional.

Traditionally, disaster recovery environments are expensive to create and maintain. The entire infrastructure must be duplicated to the disaster recovery environment, and then must be maintained. Indeed, there are numerous aspects of data and data processing systems that may change rapidly and thus must be duplicated on a continuous basis. Accordingly, in addition to continuous duplication, there is ongoing maintenance of servers, application servers, middleware, and other aspects of the two systems. There is also a large strain on the network of the organization when a large duplication project is underway. To control costs it is not uncommon for large organizations to maintain remote data centers where the duplicated data is stored. As would be expected, building and maintaining a remote data center is extremely expensive.

Alternatively, there are services that offer remote hosting of duplicated data and data processing systems. These remote hosting services allow for continuous availability at a reduced cost, which is especially advantageous to smaller organizations without their own remote data center. However, maintaining a disaster recovery environment for even a small organization can be prohibitively expensive over time.

Rather than continually maintain a fully functional provisioned environment, it would be advantageous to detect or predict when disaster recovery from a provisioned environment might be required, and then implement the provisioned environment just prior to the event. There are currently no systems that adequately predict a need for disaster recovery and implement a provisioned environment in response to that prediction.

Accordingly, there is a continued need in the art for methods and systems that can predict the possibility of a disaster and, in response, can implement a temporary provisioned environment that can be utilized in the event of the possible disaster.

SUMMARY

The disclosure is directed to inventive methods and systems for automatically provisioning a disaster recovery environment in response to a probability of an event that would necessitate a need for disaster recovery. The disaster recovery environment can be implemented in stages depending on the probability level of the event. For example, a low probability may only trigger duplication of data to the disaster recovery environment, while a higher probability can trigger enabled virtual machines which are ready to accept and utilize duplicated data. The methods and system can utilize an event management analysis engine along with a knowledge base of previous events to determine which events can potentially lead to a major incident, and based on the probability of the incident can automatically provision a disaster recovery environment in full or in stages.

According to an aspect, a method for automatically provisioning a computing environment includes the steps of: (i) receiving a first probability of a potential failure occurring within a first computing environment; (ii) comparing the first probability to a first threshold; (iii) automatically provisioning a first portion of a second computing environment in response to the first probability exceeding the first threshold; (iv) receiving a second probability of the potential failure occurring within the first computing environment; (v) comparing the second probability to a second threshold; and (vi) automatically provisioning a second portion of the second computing environment in response to the second probability exceeding the second threshold.

According to an embodiment, the method further includes the step of transferring one or more operations of the first computing environment to the provisioned second computing environment.

According to an embodiment, the method further includes the step of automatically de-provisioning the environment in response to a resolution of the failure of the first computing environment.

According to an embodiment, the method further includes the step of automatically de-provisioning the environment in response to the potential failure not occurring.

According to an embodiment, the step of receiving a first probability of a potential failure occurring within a first computing environment includes or is the step of receiving a first probability of a predicted future event causing the potential failure within the first computing environment.

According to an embodiment, the predicted future event is a weather event, a natural disaster event, a hardware failure, and/or a software failure.

According to an embodiment, the method further includes the step of querying a probability database to obtain the first probability, where the probability database includes data about one or more historical probabilities.

According to an embodiment, the method further includes the step of updating the probability database with data regarding the potential failure within the first computing environment.

According to an embodiment, the method further includes the step of querying a configuration management database for configuration information if the first or second threshold is exceeded.

According to an embodiment, the method further includes the step of receiving information from a user regarding the potential failure, where the first or second probability is increased or decreased based on the received information.

According to an embodiment, a system for automatically provisioning a computing environment includes: (i) a first computing environment; (ii) a probability database having data about one or more historical relationships between one or more events and a failure of the first computing environment; (iii) a database of predetermined probability thresholds; and (iv) an event management engine configured to receive information about a predicted future event; query the probability database about the predicted future event, where a probability of the predicted future event causing a potential failure within the first computing environment is calculated by the event management engine based at least in part on the information from the probability database; and compare the calculated probability to the predetermined probability thresholds, where the event management engine is configured to automatically provision at least part of a disaster recovery environment if the calculated probability exceeds at least one of the predetermined probability thresholds.

According to an embodiment, the system includes a configuration management database, and the event management engine is configured to query the configuration management database for configuration information if at least one of the predetermined probability thresholds is exceeded.

According to an embodiment, the system includes an external event notifier configured to provide information about a predicted future event to the event management engine.

According to an embodiment, a method for automatically provisioning a computing environment includes the steps of: (i) querying a probability database to obtain a first probability of a predicted event causing a potential failure within a first computing environment, the probability database having data about one or more historical probabilities; (ii) comparing the first probability to a first threshold; (iii) querying a configuration management database for configuration information if the first or second threshold is exceeded; (iv) automatically provisioning, using the configuration information, a first portion of a second computing environment in response to the first probability exceeding the first threshold; (v) receiving a second probability of the potential failure occurring within the first computing environment; (vi) comparing the second probability to a second threshold; and (vii) automatically provisioning a second portion of the second computing environment in response to the second probability exceeding the second threshold.

These and other aspects of the invention will become clear in the detailed description set forth below.

"Provisioning" is a very broad term with a wide variety of meanings. With regard to the present disclosure, the term "provisioning" or "provision" refers to all aspects of the creation of a new computing environment using an existing computing environment as a model. Provisioning can include, but is not necessarily limited to, duplicating and/or configuring data, settings, operating systems, and networks, among other aspects.

"Disaster Recovery" is a similarly broad term which, in the present disclosure, refers to the process and/or equipment necessary to reestablish functionality following an intentional or unintentional loss of functionality of a primary system. There can be a substantive loss of functionality or a minor loss of functionality that triggers the need for disaster recovery. The loss of functionality can be external such as natural events like flooding, earthquakes, or hurricanes. The loss of functionality can also be internal, such as hardware and/or software failures, cyberattacks, and others.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

The present disclosure is directed to embodiments of a method and system for automatically provisioning a disaster recovery environment in response to a probability of an event that would necessitate a need for disaster recovery. An event management analysis engine along with a knowledge base of previous events provides a probability regarding events that can potentially lead to a major incident, and based on the probability of the incident can automatically provision a disaster recovery environment in full or in stages. The events can be external, such as natural disasters, or internal, such as system errors, cyberattacks, or other events. In response to a sufficiently high probability, the system automatically triggers the provisioning of a disaster recovery environment. The disaster recovery environment can be implemented in full or in stages.

In view of the foregoing, a system and method is provided that utilizes an event management analysis engine along with a knowledge base of previous events and a Change and Configuration Management Database ("CCMDB") to learn what events may lead up to an incident and, based on the probability of failure from the incident, begin to take steps to auto-provision a cloud-based disaster recovery environment. According to an embodiment, as the probability of the incidence and failure increases additional disaster recovery steps are taken, eventually resulting in a fully functioning disaster recovery environment. The disaster recovery environment is provisioned and brought online, and the support agents can attempt to resolve or ameliorate the pending issue if it arises. Sometimes, the incident will not result in a failure and the provisioned disaster recovery environment will not be needed. Should the system crash in any way, the disaster recovery system is ready to take over. After the event and failure are resolved and the primary system is determined to be functional and stable, the disaster recovery environment can be de-provisioned and resources freed for other work. Should a major event occur, the disaster recovery system can take over with little to no loss of services. Throughout the entire process, the service owner will only need to possess the resources—or to pay for the resources—that were utilized during the small amount of time required to keep the disaster recovery system available during the incident.

Figure 1:
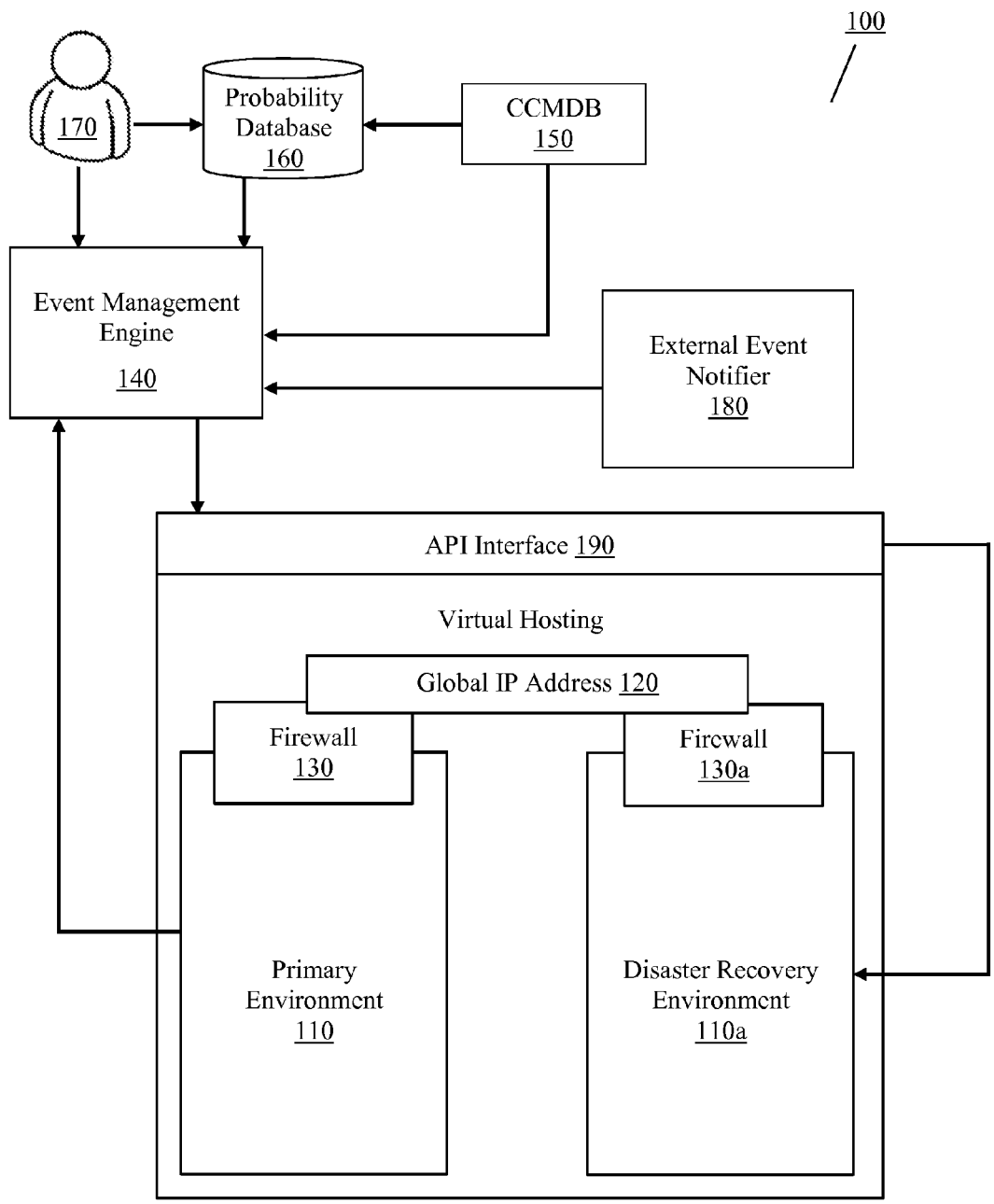
FIG. 1 is a schematic representation of a system for automatically provisioning a disaster recovery environment in accordance with an embodiment.

Referring to FIG. 1 is a generalized system 100 for automatically provisioning a disaster recovery environment, in accordance with an embodiment. The system includes a primary environment 110, which is the computing environment that the individual, organization, or business normally utilizes. The primary environment can comprise all of the data, software, hardware, settings, and more that are utilized by the organization during the normal course of business. For example, the primary environment 110 can comprise or include a network such as a virtual local area network ("VLAN") secured by a virtual firewall 130 with a global or shared IP address 120 for all incoming traffic. Many other configurations are possible.

According to the embodiment depicted in FIG. 1, the primary environment is remotely and virtually hosted, and is accessed by a global IP address 120 through a firewall 130. However, according to another embodiment the primary environment 110 is a local environment. For example, a business may have only one location or office and will host its primary computing environment at that location. As another option, the primary environment may be hosted virtually using a service that is different from the service utilized for the automated provisioning and disaster recovery.

Indeed, primary environment 110 can be any network of data processing systems, such as, for example, computers and other devices, in which the various embodiments may be implemented. The computers and other devices may, for example, be personal computers, network computers, laptop computers, handheld computers, personal digital assistants (PDAs), or smartphones, among a wide variety of other computerized devices. The primary environment 110 can also include one or more servers connected to the network, as well as one or more storage devices. The storage devices may be any type of storage device capable of storing data in a structured or unstructured format.

The primary environment may include a network system that is used to provide communication between the various computers, servers, and other devices connected together within network data processing system. The connections may be, for example, wired or wireless communication links, fiber optic cables, or a variety of other possible connections. Indeed, the primary environment network may be implemented as one or more of a number of different types of networks, such as, for example, an intranet, a local area network (LAN), a wide area network (WAN), or the internet.

The primary environment 110 may include additional servers, clients, and other devices not shown to implement processes of illustrative embodiments. The methods and systems described or otherwise envisioned herein are not limited to any particular structure, formulation, or location of the primary environment 110. For example, illustrative embodiments may be implemented within a single data processing system instead of within a network data processing system.

The functionality and operation of the primary environment 110 is continually monitored by standard monitoring agents such as the IBM® Tivoli® Composite Application Manager for Application Diagnostics, which monitors the health of web applications and servers. Many other monitoring agents are possible, including but not limited to Nimsoft®, ManageEngine®, and Nagios®, among many, many others. These monitoring agents will potentially detect an issue, or conditions that may lead to an issue, which can ultimately result in an incident or event such as a failure.

System 100 also includes an event management engine 140 that monitors various inputs and determines whether there is a need for provisioning of a disaster recovery environment. The event management engine 140 can be a network data processing system which is physically and/or virtually distributed over several locations, optionally with duplication in the event of a failure. Accordingly, the event management engine 140 may be centrally or remotely located from the primary environment 110. According to an embodiment, the event management engine 140 is a software solution such as data mining and/or machine learning software, a neural network, predictive model software, or any of a variety of other software. The event management engine 140 is programmed and/or configured to accept input from multiple sources, sometimes in different formats, evaluate and analyze the input to create a predictive model or probability, and then implement programmed outcomes based on the predictive model or probability.

The inputs to the event management engine 140 can include, for example, information from a Change and Configuration Management Database ("CCMDB") 150. According to the embodiment, the CCMDB 150 is a repository of information technology assets called Configuration Items ("CI"), as well as the relationships between those assets. The CIs can be, for example, software, hardware, facilities, people, products, and/or services, among many other things. The CCMDB is utilized to track the assets and their relationships, which allows for the reconstruction of those CIs if necessary. Each CI in the CCMDB may comprise a unique identifier, a description, and relationship information, among other elements. Within the framework of the present invention, the CCMDB 150 can be utilized, for example, to determine and/or assign relationships between events and individual CIs within the primary environment 110.

According to an embodiment, the event management engine receives information from the one or more monitoring agents for primary environment 110. The information can be continuous or periodic updates about the health of the primary environment 110, or can be only alerts from the monitoring agents. For example, the monitoring agent can detect a faulty or failed server, power fluctuations, unexpectedly high demand, or a wide variety of other events that will trigger an alert that can then be communicated, manually or automatically, to the event management engine 140.

Another input to the event management engine 140 can be, for example, information from a probability database 160. The probability database stores information about the types of events or changes that are associated with some probability of component failure, whether the probability is very high, very low, or somewhere in between. Additionally, the probability database can relate the type of information technology service with the type of event or change and the corresponding probability of component failure. For example, a business service running on a server may typically need 10 gigabytes of free disk space as temporary storage, and without that free disk space the service could freeze or fail. The 10 gigabytes of free space can be utilized as a threshold for predicting a failure; as the amount of free space decreases closer and closer to a maximum of 10 gigabytes, the probability of a failure will increase. While it is in the best interest of the service managers to resolve the disk space issue, the system has become unstable and could fail at any time.

Yet another input to the event management engine 140 can be, for example, information from an External Event Notifier 180. The external event notifier can provide information about external events such as weather, natural disasters, news items, or a variety of other information. As an example, the external event notifier 180 can be configured to receive continuous or periodic weather updates and predictions for one or more locations where components of the system are located. According to one embodiment, the external event notifier may even comprise sensors such as temperature sensors, wind sensors, accelerometers (for earthquake detection), or a wide variety of other sensors.

Another input to the event management engine 140 can be, for example, information from a user 170. The user can provide information that is not available from any other source, or can supplement, modify, or filter information provided by one or more other sources. For example, the user can provide information about an event that is currently underway or could be realized but is not detectable by the various traditional inputs to the event management engine 140. For example, information about civil unrest in a location where one or more components of the primary environment 110 are located could be information that is important to the event management engine 140 but is otherwise unavailable through traditional inputs.

Utilizing the various inputs, the event management engine 140 can evaluate and analyze the input to create a predictive model or probability, and then implement programmed outcomes based on the predictive model or probability. For example, according to one embodiment the engine determines the probability of a failure, compares it to the criticality of the business service that will or could be affected, and decides how much of the disaster recovery environment to process, ranging from a small portion to an entire duplicated environment. The event management engine 140 can also invoke API calls on the hosting center to provision the disaster recovery system.

According to an embodiment, the virtual hosting facility has an API interface 190 that allows provisioning and de-provisioning of the system via programmatic calls. For example, the event management engine 140 can interact with the hosting component(s) via the protocols specified by that API. According to an embodiment, the virtual hosting facility and/or API is configured, programmed, or designed such that commands issued to the API—or to the virtual hosting facility via the API—cause the hosting facility to provision a disaster recovery environment 110a. Another command issued to the API—or to the virtual hosting facility via the API—can cause the hosting facility to transfer some or all functionality to the disaster recovery environment 110a. For example, the issued command to transfer some or all functionality can cause the virtual hosting facility to modify the system such that some or all communication to the global IP address 120 is routed to the disaster recovery environment 110a. For example, a first command may cause provisioning of the disaster recovery environment 110a without transferring any functionality; another command may cause the transfer of some functionality to the disaster recovery environment 110a from the primary environment; another command may transfer additional functionality to the disaster recovery environment 110a from the primary environment; yet another commend may transfer all of the functionality of the primary environment 110 to the disaster recovery environment. According to another embodiment, the event management engine 140 issued another command to the API—or to the virtual hosting facility via the API—that causes the hosting facility to de-provision the disaster recovery environment. This command might be issued, for example, if the disaster recovery environment 110a is no longer needed. In these embodiments, therefore, the event management engine 140 may only issue commands to the API or to the virtual hosting facility via the API, thereby resulting in the desired outcome. This multi-functionality is possible when, for example, the primary environment 110 and the disaster recovery environment 110a are hosted within the same virtual hosting facility.

If the primary environment 110 and the disaster recovery environment 110a are to be located or hosted in or by different hosts, then additional functionality will be required in order to cause provisioning of the disaster recovery environment 110a at its hosting location from the primary environment's hosting location. Communication between the hosting environments will be required but is well within the skill of one in the art.

In response to the need for a disaster recovery environment 110a, which can be determined by the event management engine 140 and initiated by a command from the engine to the API or to the virtual hosting facility via the API or according to another embodiment to the same or separate hosting facility directly, a secondary environment (disaster recovery environment 110a) is established, partitioned, or otherwise created or set aside. The disaster recovery environment 110a can comprise or include a network such as a VLAN secured by a virtual firewall 130a. Many other configurations are possible.

According to an embodiment, the methods and systems described herein or otherwise envisioned can dynamically manage capacity based on future demand probabilities. Measuring probability of downtime can also be used to measure future demand. For example, knowing that Black Friday is approaching can signify that additional demand is needed for an online store or service. As another example, knowledge about an approaching storm may cause a significant—but known and anticipated—increase in the demand for a weather application as well as the accompanying demand on the app's servers. The system can adapt to utilize and account for these types of probabilities. As another example, knowing that a gradual increase in CPU can drive the need for additional CPUs to be procured and then provisioned. Accordingly, rather than provisioning a disaster recovery environment, the system and method can selectively procure and provision for additional capacity. For example, if the system is utilizing a cloud environment, an increase in CPU demand can be mitigated by provisioning additional virtual machines. Then, if the CPU demand continues to rise, the system can initiate a configuration request onto the virtual machines or request a cluster add command, for example. These and many other options are possible.

Figure 2:
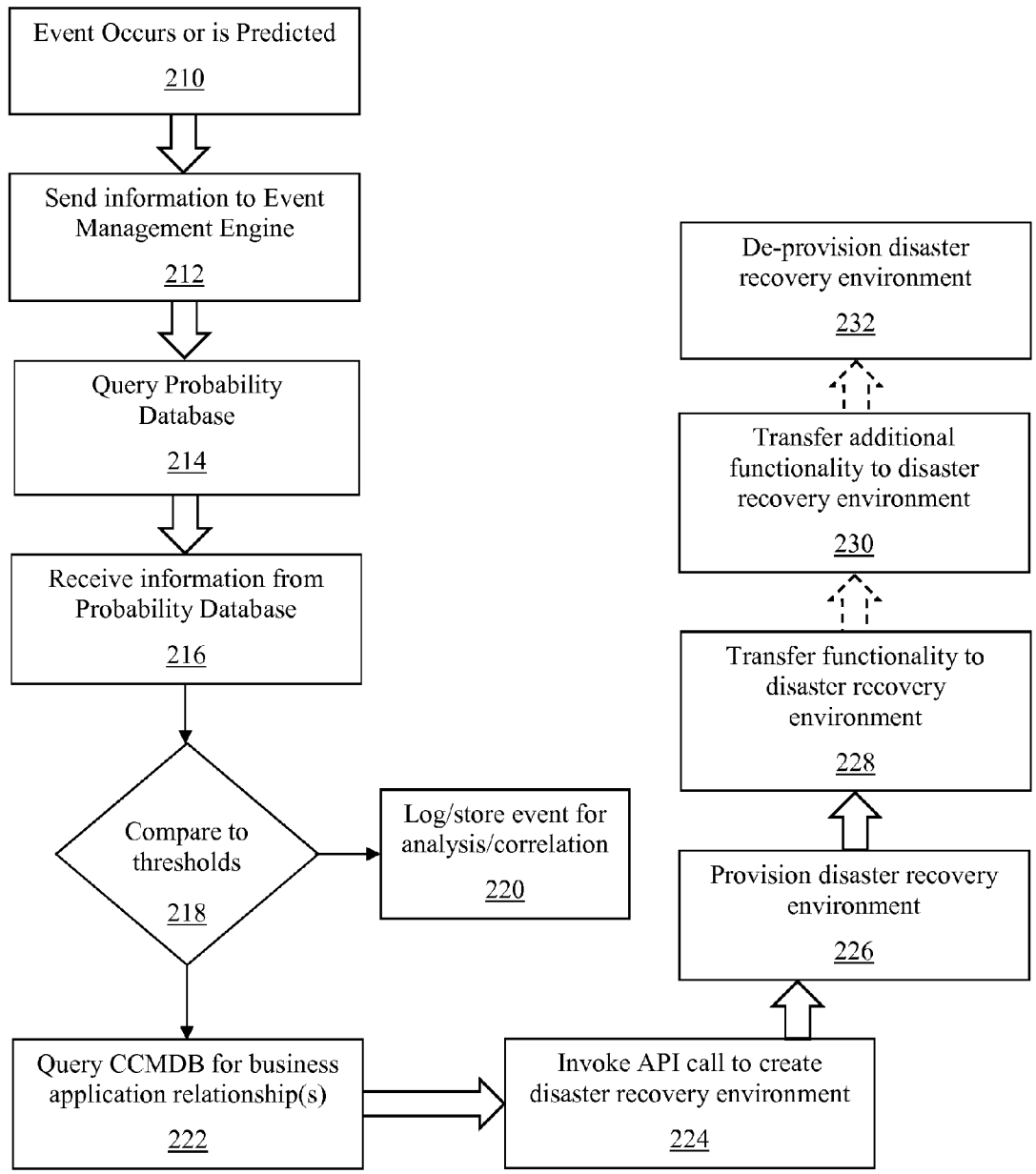
FIG. 2 is a flow chart of a method for automatically provisioning a disaster recovery environment in accordance with an embodiment.

Referring to FIG. 2 is a flow chart of a method 200 for automatically provisioning a disaster recovery environment, in accordance with an embodiment. The method utilizes one or more embodiments of the systems described or otherwise envisioned herein. At step 210 of the method, an event occurs or is predicted to occur that could necessitate a need for a disaster recovery environment. The event could be, for example, the available free memory for a server dropping below a 20% threshold. Alternatively, the event could be a long-term prediction for a hurricane of sustained winds above 100 kph within 150 kilometers of one or more components of the primary computing environment, such as offices or a server farm. Many other events are possible, as described above and otherwise envisioned. At step 220, the information is conveyed to the event management engine 140 for analysis. The information sent to the engine can be from any of the inputs described above, including from a user, the monitoring agents, and/or the external event notifier 180.

At step 214, the event management engine queries the probability database for information. For example, with regard to the example above, the event management engine can query the probability database for information about the specific CIs involved, specifically how critical is the 20% free memory threshold? Or the information could be about what CIs might be affected by a weather event predicted for a certain region of the country or the world. The information could also be historical information about past events, such as past occurrences of the server dropping below 20% free memory, or past outcomes of predicted hurricanes in a particular region.

At step 216, the information from the probability database query is returned to the event management engine. The information can comprise a probability of failure, or the event management engine can calculate the probability of failure based on the received information. For example, the information form the probability database query can indicate that 20% of free memory has never caused a failure, but 5% free memory has caused a failure. The engine's rules calculate that the system has a 40% likelihood of a failure due to the free memory issue.

At step 218, the calculated probability from the event management engine 140 is compared to one or more thresholds to determine whether a disaster recovery environment should be created. The one or more thresholds can be predetermined, such as by a programmer or administrator, or can be based on past outcomes in a machine learning system. For example, an administrator can set a threshold such that any event with a 25% probability or greater will trigger the creation of a disaster recovery environment, while less than a 25% probability can be logged and analyzed but will not trigger the creation of a disaster recovery environment. Alternatively, the system can be programmed, designed, and/or configured to learn to trigger the creation of a disaster recovery environment based on past events, or based on a determined or programmed tolerance.

At step 220, the threshold is not satisfied, and a disaster recovery environment is not triggered. The event or probability and associated information is logged or stored for analysis and/or correlation. For example, the event or probability and associated information can be associated with the one or more CIs that could have been affected, which will lead to improved prediction in future situations.

At step 222, the CCMDB is queried by the event management engine 140 to determine what step(s) might be necessary to implement the disaster recovery environment. For example, the CCMDB information may indicate that certain information technology assets, CIs, must be implemented in the triggered disaster recovery environment in order for the environment to function properly, and for the smooth transition of functionality from the primary environment to the disaster recovery environment. This identification can be based on information such as the CIs directly involved as well as the relationship data between these CIs and other CIs, which may then implicate the additional CIs in the disaster recovery environment even though their functionality is not directly threatened by the event.

At step 224, the event management engine 140 invokes the creation of the disaster recovery environment. According to an embodiment, the engine invokes the API call to the virtual hosting center, and at step 226 the disaster recovery environment is provisioned. As another embodiment, the engine can more directly cause the provisioning of the disaster recovery environment. Based on the probability of failure, certain steps can be taken. For example, if the probability is below a first threshold, only the operating system may be provisioned. If the probability is above the first threshold but below a second threshold, the operating system and middleware may be provisioned. Generally, a greater probability of failure will result in more disaster recovery steps being taken. The goal is to deploy the disaster recovery just in time for a failure. Depending on the type of CI being monitored, the steps to provision will be different. Some may restore databases, others may implement base un-configured systems.

At step 228, functionality is transferred/activated from the primary environment to the provisioned disaster recovery environment. This may occur automatically as soon as the disaster recovery environment is provisioned, or may occur only if an additional threshold is satisfied. Some functionality may be transferred or activated, or all possible functionality may be transferred or activated. For example, once the failure occurs, the primary firewall 130 may detect that the primary environment 110 is unavailable. The primary firewall can then disable itself. The disaster recovery firewall 130*a* can then detect the failure and/or deactivation of the primary firewall, and the disaster recovery firewall can take over the global IP address 120 to activate the provisioned disaster recovery environment. Traffic will then be routed to the provisioned disaster recovery environment rather than the non-functional primary environment, or at least the non-functional component(s) of the primary environment.

At step 230, if less than all functionality is activated or transferred initially, additional functionality can be activated or transferred as a subsequent step. For example, increasing probabilities of a failure can trigger a series of thresholds leading to creation of the disaster recovery environment, initial transfer or activation of functionality to the disaster recovery environment, and then full transfer or activation of functionality to the disaster recovery environment.

At step 232, the event or incident has passed and the functionality returns to the primary environment, and the disaster recovery environment can be de-provisioned. This step may include the prior step of checking or receiving confirmation that the primary environment is capable and/or ready to accept functionality from the disaster recovery environment. In the event of failures where devices are damaged, the transfer of functionality may wait for the devices to be replaced. This may involve querying the CCMDB for confirmation that the devices have been replaced, or may involve awaiting information from an administrator that the devices have been replaced. Alternatively, the transfer of functionality and/or de-provisioning of the disaster recovery environment can be a more passive action in which they occur in response to a command from the engine regardless of the functionality or status of the primary environment.

As a first example, assume that an organization offering a software as a service ("SAAS") product to customers has its base of operations, including its offices and hundreds of servers, located outside the city of New Orleans, La. The business has employed a virtual hosting service, which is located outside Dallas, Tex., to provide virtual machines and environments when needed. At step 210, the external event notifier 180 of the business receives a weather update indicating that a hurricane is in the Gulf of Mexico and has a 5% chance of landing within 150 kilometers of New Orleans. The event management engine 140 receives the information and queries the probability database 160 about historical events, such as what has happened with previous hurricane predictions based on a 5% likelihood. The probability database 160 query reveals to the event management engine that in 100 years of available data, a 5% likelihood has only resulted in a damaging hurricane in this location 14.3% of the time. The event management engine compares that to its preprogrammed or learned thresholds, and determines that a 14.3% probability does not satisfy the current threshold of 25%, and no action is taken. Optionally, the event management engine 140 sets a reminder or series of reminders to periodically query a user interface and/or the external event notifier 180 to monitor the current situation.

Approximately 4 hours later, the external event notifier 180 receives a weather update indicating that the hurricane now has a 40% chance of landing within 150 kilometers of New Orleans. The event management engine 140 receives the new information and queries the probability database 160. The probability database 160 query reveals to the event management engine that in 100 years of available data, a 40% likelihood has resulted in a damaging hurricane in this location 26.7% of the time. The event management engine compares that to its preprogrammed or learned thresholds, and determines that a 26.7% probability does satisfy the current threshold of 25%. As a result, the business activates the virtual hosting service located outside Dallas, Tex., to provide one or more virtual machines and environments. The business duplicates all essential data to the virtual machines for emergency storage and backup.

One hour later, the external event notifier 180 receives a weather update indicating that the hurricane now has an 85% chance of landing within 150 kilometers of New Orleans. The event management engine 140 receives the new information and queries the probability database 160. The probability database 160 query reveals to the event management engine that in 100 years of available data, an 85% likelihood has resulted in a damaging hurricane in this location 93.4% of the time. The event management engine compares that to its preprogrammed or learned thresholds, and determines that a 93.4% probability is well above the second level threshold of 50%. As a result, the business completes the provisioning of a full disaster recovery environment. Once the storm has passed and the offices and servers are back to sufficient capacity, the business can transfer data back to the home location and can de-provision the disaster recovery environment.

Although this example uses the external event notifier and information about a storm, a wide variety of other scenarios, triggers, events, and/or incidents are possible. Instead of a storm, the information can be an earthquake, flooding, blizzard, power outage, server damage, cooling or heating issues, sabotage, cyberattack, or many, many other scenarios. Further, while there may be hours of advance notice prior to the event, some events may only have minutes or milliseconds, but the system will still be able to analyze the scenario and facts and take action.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for automatically provisioning a computing environment, the method comprising the steps of:
   receiving a first probability of a potential failure occurring within a first computing environment;
   comparing the first probability to a first threshold;
   automatically provisioning a first portion of a second computing environment in response to the first probability exceeding the first threshold;
   receiving a second probability of the potential failure occurring within the first computing environment;
   comparing the second probability to a second threshold;
   receiving information from a user regarding the potential failure, wherein the first or second probability is increased or decreased based on the received information; and
   automatically provisioning a second portion of the second computing environment in response to the second probability exceeding the second threshold.

2. The method of claim 1, further comprising the step of transferring one or more operations of the first computing environment to the provisioned second computing environment.

3. The method of claim 1, further comprising the step of automatically de-provisioning the environment in response to a resolution of the failure of the first computing environment.

4. The method of claim 1, further comprising the step of automatically de-provisioning the environment in response to the potential failure not occurring.

5. The method of claim 1, wherein the step of receiving a first probability of a potential failure occurring within a first computing environment comprises receiving a first probability of a predicted future event causing the potential failure within the first computing environment.

6. The method of claim 5, wherein the predicted future event is a weather event.

7. The method of claim 5, wherein the predicted future event is a natural disaster event.

8. The method of claim 5, wherein the predicted future event is a hardware failure.

9. The method of claim 5, wherein the predicted future event is a software failure.

10. The method of claim 1, further comprising the step of querying a probability database to obtain the first probability, wherein the probability database comprises data about one or more historical probabilities.

11. The method of claim 10, further comprising the step of updating the probability database with data regarding the potential failure within the first computing environment.

12. The method of claim 1, further comprising the step of querying a configuration management database for configuration information if the first or second threshold is exceeded.

13. A system for automatically provisioning a computing environment, the system comprising:
   a first computing environment;
   a probability database, the probability database comprising data about one or more historical relationships between one or more events and a failure of the first computing environment;
   a database of predetermined probability thresholds; and
   an event management engine configured to (i) receive information about a predicted future event, and (ii) query the probability database about the predicted future event, wherein a probability of the predicted future event causing a potential failure within the first computing environment is calculated by the event management engine based at least in part on the information from the probability database, and (iii) compare the calculated probability to the predetermined probability thresholds, and (iv) receive information from a user regarding the potential failure, wherein the first or second probability is increased or decreased based on the received information, wherein the event management engine is configured to automatically provision at least part of a disaster recovery environment if the calculated probability exceeds at least one of the predetermined probability thresholds.

14. The system of claim 13, further comprising a configuration management database, wherein the event management engine is further configured to query the configuration management database for configuration information if at least one of the predetermined probability thresholds is exceeded.

15. The system of claim 13, further comprising an external event notifier configured to provide information about a predicted future event to the event management engine.

16. The system of claim 13, where the predicted future event is a natural disaster event.

17. The system of claim 13, where the predicted future event is a hardware failure.

18. The system of claim 13, where the predicted future event is a software failure.

19. A method for automatically provisioning a computing environment, the method comprising the steps of:
   querying a probability database to obtain a first probability of a predicted event causing a potential failure within a first computing environment, wherein the probability database comprises data about one or more historical probabilities;
   comparing the first probability to a first threshold;
   querying a configuration management database for configuration information if the first or second threshold is exceeded;
   automatically provisioning, using the configuration information, a first portion of a second computing environment in response to the first probability exceeding the first threshold;
   receiving a second probability of the potential failure occurring within the first computing environment;
   comparing the second probability to a second threshold;

receiving information from a user regarding the potential failure, wherein the first or second probability is increased or decreased based on the received information; and automatically provisioning a second portion of the second computing environment in response to the second probability exceeding the second threshold.

* * * * *